(12) United States Patent
Lindholm et al.

(10) Patent No.: US 6,694,295 B2
(45) Date of Patent: *Feb. 17, 2004

(54) METHOD AND A DEVICE FOR RECOGNIZING SPEECH

(75) Inventors: Christian Lindholm, Helsinki (FI); Kari Laurila, Tampere (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,142

(22) Filed: May 17, 1999

(65) Prior Publication Data

US 2002/0032567 A1 Mar. 14, 2002

(30) Foreign Application Priority Data

May 25, 1998 (FI) .................................. 981154

(51) Int. Cl.[7] ............................................. G10L 15/22
(52) U.S. Cl. ..................... 704/252; 704/254; 704/275
(58) Field of Search ............................. 704/235, 251, 704/252, 255, 256, 270, 275, 276, 254; 382/116

(56) References Cited

U.S. PATENT DOCUMENTS

| | | | |
|---|---|---|---|
| 4,866,778 A | | 9/1989 | Baker |
| 5,020,107 A | * | 5/1991 | Rohani et al. ............... 704/275 |
| 5,027,406 A | * | 6/1991 | Roberts et al. .............. 704/251 |
| 5,335,276 A | * | 8/1994 | Thompson et al. ...... 379/88.13 |

(List continued on next page.)

FOREIGN PATENT DOCUMENTS

| | | |
|---|---|---|
| EP | 0661688 A2 | 7/1995 |
| EP | 0718823 A2 | 6/1996 |

OTHER PUBLICATIONS

"Integrated Audio–Graphics User Interface", IBM Technical Disclosure Bulletin, vol. 33, No. 11, pp. 368–371, Apr. 1991.
Patent Abstracts of Japan, Publication No. JP 07311656.
Patent Abstracts of Japan, Publication No. JP 08202386.
"Signal Modeling Techniques in Speech Recognition", Proceedings of the IEEE, vol. 81, No. 9, pp. 1215–1247, Sep. 1993.

*Primary Examiner*—Richemond Dorvil
*Assistant Examiner*—Martin Lerner
(74) *Attorney, Agent, or Firm*—Perman & Green, LLP (57) ABSTRACT

According to the invention, speech recognition can be limited to a smaller number making use of commands (16, 17) given by a user. By means of a method and device, according to the invention, it is also possible to activate a speech recognition device by making use, in the activation, of an existing keyboard or a touch-sensitive screen of the device. A method, according to the invention, provides the user with a logical way to activate the speech recognition device in the device simultaneously providing an improved capacity of the speech recognition device. According to the invention, it is also possible to carry out the speech recognition process by making use of commands given by the user irrespective of how the speech recognition device itself is activated. According to an embodiment of the invention, the device comprises a touch-sensitive screen or surface, in which case the information about a single letter or several letters written on the screen is transmitted to the speech recognition device, whereupon speech recognition is limited to words, wherein the letters in question occur. Speech recognition is most preferably limited to a name beginning with the letter written on the touch screen by the user.

21 Claims, 5 Drawing Sheets

U.S. PATENT DOCUMENTS

| | | | |
|---|---|---|---|
| 5,425,128 A | | 6/1995 | Morrison |
| 5,544,654 A | | 8/1996 | Murphy et al. |
| 5,621,809 A | * | 4/1997 | Bellegarda et al. .......... 382/116 |
| 5,640,485 A | | 6/1997 | Ranta |
| 5,664,061 A | * | 9/1997 | Andreshak et al. ......... 704/275 |
| 5,692,032 A | | 11/1997 | Seppanen et al. |
| 5,794,142 A | | 8/1998 | Vanttila et al. |
| 5,845,205 A | | 12/1998 | Alanara et al. |
| 5,864,603 A | | 1/1999 | Haavisto et al. |
| 5,870,683 A | | 2/1999 | Wells et al. |
| 5,878,351 A | | 3/1999 | Alanara et al. |
| 5,887,264 A | | 3/1999 | Kohler |
| 5,892,475 A | | 4/1999 | Palatsi |
| 6,009,336 A | * | 12/1999 | Harris et al. ................. 455/566 |
| 6,055,333 A | * | 4/2000 | Guzik et al. ................. 382/187 |
| 6,084,951 A | * | 7/2000 | Smith et al. ............. 379/93.17 |
| 6,108,631 A | * | 8/2000 | Rühl .......................... 704/270 |
| 6,401,065 B1 | * | 6/2002 | Kanevsky et al. .......... 704/256 |
| 6,438,523 B1 | * | 8/2002 | Oberteuffer et al. ........ 704/270 |

* cited by examiner

METHOD AND A DEVICE FOR RECOGNIZING SPEECH

OBJECT OF THE INVENTION

The present invention relates to a method for recognising speech and a device that utilises the speech recognition method according to the invention.

BACKGROUND OF THE INVENTION

Normally, in mobile telephones, it is possible to browse through a telephone notepad to select a name by making use of the first letter of the name searched for. In this case, when a user during the search presses, e.g. the letter "s", the names beginning with the letter "s" are retrieved from a memory. Thus, the user can more quickly find the name he/she is looking for without needing to browse through the content of the notepad in alphabetical order in order to find the name. This kind of method is fully manual and is based on the commands given by the user through a keyboard and the browsing of a memory based on this.

Today, there are also some mobile stations that utilise speech recognition devices, wherein a user can give a command by voice. In these devices, the speech recognition device is often speaker-dependent; i.e. the operation of the speech recognition device is based on that the user teaches the speech recognition device words that the speech recognition device is supposed to later recognise. There are also so-called speaker-independent speech recognition devices for which no separate training phase is required. In this case, the operation of the speech recognition device is based on a large amount of teaching material compiled from a large sampling of different types of speakers. Moderate operation in case of a so-called average user is typical of a speaker-independent recognition device. Correspondingly, a speaker-dependent speech recognition device operates best for the person who has trained the speech recognition device.

It is typical of both speech recognition devices mentioned above that the performance of the speech recognition device greatly depends on how large a vocabulary is used. It is also typical of speech recognition devices according to prior art that they are limited to a specific number of words, which the speech recognition device is capable of recognising. For example, in mobile stations, a user is provided with a maximum of 20 names, which he/she can store in a notepad within the telephone by voice and, correspondingly, use these stored names in connection with voice selection. It is quite obvious that such a number is not sufficient in present or future applications, where the objective is to substantially increase the number of words to be recognised. As the number of words to be recognised increases, e.g. ten-fold, with current methods, it is not possible to maintain the same speech recognition capacity as when using a smaller vocabulary. Another limiting factor, e.g. in terminal equipment, is the need for a memory to be used, which naturally increases as the vocabulary of the speech recognition device expands.

In current speech recognition devices according to prior art, the activation of a speech recognition device can be implemented by voice using a specific activation command, such as e.g. "ACTIVATE", whereupon the speech recognition device is activated and is ready to receive commands from a user. A speech recognition device can also be activated with a separate key. It is typical of speech recognition devices activated by voice that the performance of the activation is dependent on the noise level of the surroundings. Also during the operation of the speech recognition device, the noise level of the surroundings greatly affects the performance of the speech recognition device to be achieved. It can be said that critical parameters for the performance of a speech recognition device are the extent of the vocabulary and the noise conditions of the surroundings.

A further known speech recognition system is disclosed in U.S. Pat. No. 4,866,778 where a user can select a sub-vocabulary of words by selecting an initial string of one or more letters causing the recognition to be performed against the sub-vocabulary restricted to words starting with those initial letters.

SHORT SUMMARY OF THE INVENTION

Now, we have invented a method and a device for recognising speech the objective of which is to avoid or, at least, to mitigate the above-mentioned problems of prior art. The present invention relates to a device and a method, wherein a user is allowed to give, during speech recognition, a qualifier by means of which speech recognition is only limited to those speech models that correspond with the qualifier provided by the user. In this case, only a specific sub-set to be used during speech recognition is selected from the prestored speech models.

According to an embodiment of the invention, a speech recognition device is activated at the same time as a qualifier that limits speech recognition is provided by touching the device making use of the existing keyboard or touch-sensitive screen/base of the device. The activation is most preferably implemented with a key. A method according to the invention provides a user with a logical way to activate the speech recognition device therein at the same time providing an improved performance of the speech recognition device along with the entered qualifier. The limitation of speech recognition according to the invention can also be implemented apart from the activation of the speech recognition device.

According to an exemplary embodiment of the invention, the device comprises a touch-sensitive screen or surface (base), whereupon the information about the character or several characters written on the screen is transmitted to the speech recognition device, in which case speech recognition is limited to words wherein the characters in question occur. Speech recognition is most preferably limited to a name beginning with the character written by the user on the touch screen.

According to an exemplary embodiment of the invention, speech recognition can also be implemented by making use in advance of all the stored models and by utilising the limiting qualifier provided by the user when defining the final recognition result.

According to a first aspect of the invention there is provided a method for recognising an utterance of a user with a device, wherein a set of models of the utterances have been stored in advance and for speech recognition, the utterance of the user is received, the utterance of the user is compared with the prestored models and, on the basis of the comparison, a recognition decision is made, the method being characterised in that, the user is allowed to provide a qualifier limiting the comparison by touching the device, the qualifier identifying an item in a menu structure of the device, a sub-set of models is selected from the stored models on the basis of the qualifier provided by the user said sub-set of models identifying sub-items of the menu structure, and a comparison is made for making the recognition decision by comparing the utterance of the user with said sub-set of models.

According to a second aspect of the invention there is provided a method for recognising an utterance of a user with a device, wherein a set of models of the utterances have been stored in advance and for speech recognition, the utterance of the user is received, the utterance of the user is compared with the prestored models and, on the basis of the comparison, a recognition decision is made, the method being characterised in that, a comparison is made for making a first recognition decision by comparing the utterance of the user with the prestored models, the user is allowed to provide a qualifier limiting the comparison by touching the device for selecting a sub-set of models, the qualifier identifying an item in a menu structure of the device and said sub-set of models identifies sub-items of the menu structure, a final comparison is made for making the recognition decision by comparing the first recognition decision with said sub-set of models.

According to a third aspect of the invention there is provided a device comprising a speech recognition device for recognising the utterance of a user, memory means for storing speech models, and means for receiving the utterance of the user, comparison means for carrying out the recognition process by comparing the utterance of the user with the models stored in the memory means, the device being characterised in that the device also comprises means for receiving a qualifier from the user by touching the device, means for selecting a set from the stored models on the basis of the qualifier received from the user for limiting the comparison made by the comparison means to said set of models and means for storing a menu structure of a device and for identifying the received qualifier as an item in a menu structure of the device.

DETAILED DESCRIPTION OF THE INVENTION

Figure 1:
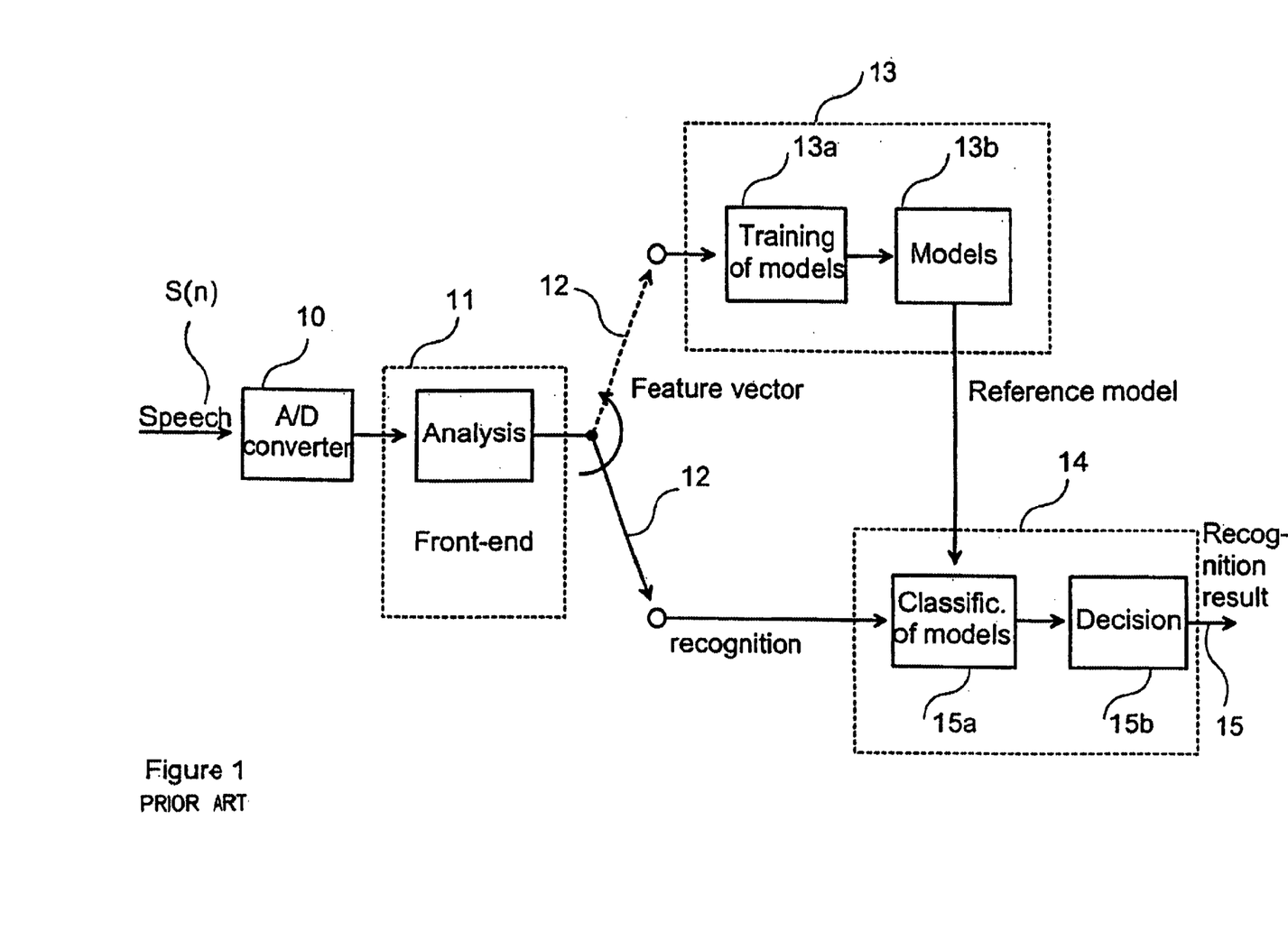
FIG. 1 shows the structure of a speech recognition device, according to prior art, as a block diagram.

FIG. 1 shows the block diagram structure of a known speech recognition device as applicable to the present invention. Typically, the operation of the speech recognition device is divided into two different main activities: an actual speech recognition phase 10–12, 14–15 and a speech training phase 10–13, as shown in FIG. 1. The speech recognition device receives from a microphone as its input a speech signal S(n), which is converted into a digital form by an A/D converter 10 using, e.g. a sampling frequency of 8 kHz and a 12-bit resolution per sample. Typically, the speech recognition device comprises a so-called front-end 11, wherein the speech signal is analysed and a feature vector 12 is modelled, the feature vector describing the speech signal during a specific period. The feature vector is defined, e.g. at 10 ms intervals. The feature vector can be modelled using several different techniques. For example, different kinds of techniques for modelling a feature vector have been presented in the reference: J. Picone, "Signal modeling techniques in speech recognition", IEEE Proceedings, Vol. 81, No. 9, pp. 1215–1247, September 1993. During the training phase, models are constructed by means of the feature vector 12, in a training block 13 of the speech recognition device, for the words used by the speech recognition device. In model training 13a, a model is defined for the word to be recognised. In the training phase, a repetition of the word to be modelled can be utilised. The models are stored in a memory 13b. During speech recognition, the feature vector 12 is transmitted to an actual recognition device 14, which compares, in a block 15a, the models constructed during the training phase with the feature vectors to be constructed of the speech to be recognised, and the decision on the recognition result is made in a block 15b. The recognition result 15 denotes the word, stored in the memory of the speech recognition device, that best corresponds with the word uttered by a person using the speech recognition device.

Figure 2:
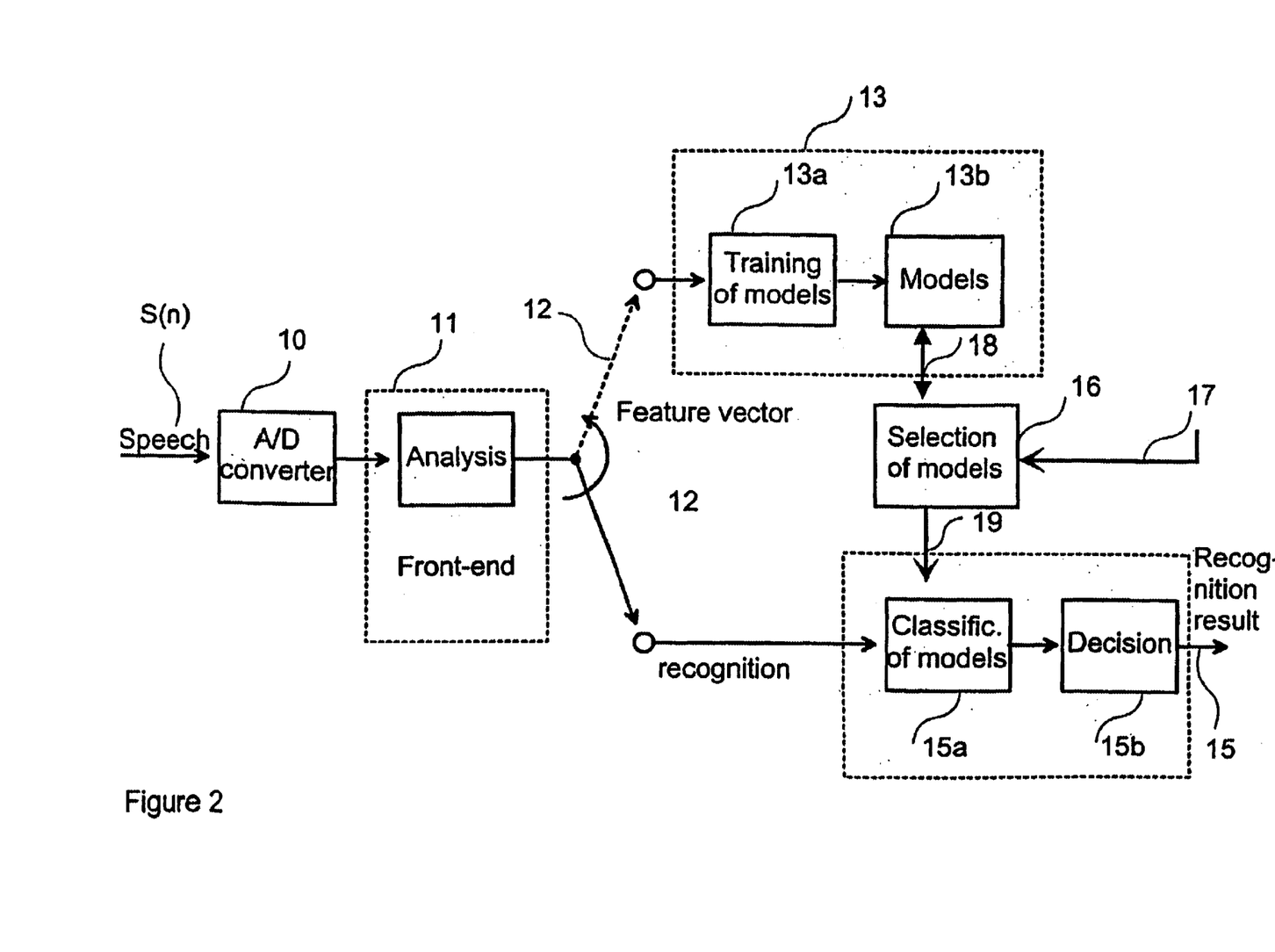
FIG. 2 shows the structure of a speech recognition device, according to the invention, as a block diagram.

FIG. 2 shows the operation of a speech recognition device according to the invention where, in addition to the solution according to FIG. 1, the speech recognition device comprises a block 16, wherein the selection of the models is carried out on the basis of the commands given by a user, e.g. through a keyboard. The block 16 receives as its input a signal 17 containing the information on which key the user has pressed. In the block 16, speech models 18, transmitted by the block 13b, are compared with the signal 17 and a sub-set 19 is selected from these and transmitted to the block 15a of the speech recognition device. The selection of the models relating to the operation of the block 16 has been described below making use of a memory structure according to the present invention.

TABLE 1

| Name | Number | Reference Model |
|---|---|---|
| Smith Paul | 0405459883 | XXX . . . X |
| . . . | | |

TABLE 2

| Menu | | |
|---|---|---|
| | Phone Settings | |
| | Messages | |
| | | Read messages |
| | | Write messages |
| | Memory Functions | |

Table 1 shows a memory structure according to the invention, which may form, e.g. a phone notepad of a mobile station or part of it. The memory comprises the name of a person, a telephone number that corresponds with the name, as well as a reference model (e.g. a feature vector) constructed during the speech recognition training phase. The table shows as an example one line of the table, on which a person's name "Smith", a corresponding telephone number "0405459883", as well as a data field containing a reference model "xxx . . . x" are stored. The length of the reference model is a speech recognition device-specific parameter and, therefore, the field length depends on the speech recognition device used. According to the invention, when a user presses a specific key of the device, e.g. the key "s", the processor of the device goes through the content of the memory and compares the content of the data field containing the name and only retrieves from the memory the names that begin with the letter "s". The comparison can be made, e.g. by comparing the ASCII character of the pressed key with the ASCII character of the first letter of the name in the memory and by selecting the reference model that corresponds with the name provided that the letters correspond with one another in the comparison. The information on the selected reference models (sub-set) is then transmitted to the speech recognition device, after which the speech recognition device carries out speech recognition using the models that relate to the names selected above.

The user can further also press another key, e.g. the key "m", whereupon speech recognition is limited to the names beginning with the letter combination "Sm". In this case, the number of names to be recognised can be further limited, i.e. the sub-set of models decreases. In addition, it is also possible that the memory contains fields other than the above-mentioned name field on the basis of which the speech recognition device is activated according to the invention. The telephone memory of a device, such as a mobile station, may contain, e.g. a field that indicates whether a specific number is a mobile station number or not. In this case, the memory field may contain, e.g. an element "GSM", whereupon when the user activates this field only the GSM numbers are selected and not the others, e.g. the numbers of a fixed network or fax numbers. Thus, the invention is not limited to a case wherein the letter selected by the user controls the operation of the speech recognition device but, instead, the user may select names, e.g. from a telephone notepad according to some other classification. For example, the names in a telephone notepad may have been divided into classes like "Home", "Office", "Friends", in which case the mobile station may provide a convenient way to select from the menu, e.g. the class "Friends", whereupon speech recognition is directed to the names in this class, according to the invention. It is also possible that the mobile station comprises a keyboard, wherein several different characters are combined in a specific key. For example, the letter symbols "j, k, l" may be included in the numeric key "5". In this case, the invention can be applied so that when the user presses the key "5", the speech recognition device is activated so that, in speech recognition, it is limited to names beginning with the letters "j", "k" or "l". In an exemplary embodiment of the invention, when the user presses the key SEND speech recognition, according to the invention, can be limited, e.g. to the last made calls (e.g. the last 10 calls). In this case, a call can be commenced, e.g. by pressing and holding the key SEND, while the user simultaneously pronounces the name to be recognised, whereupon speech recognition is limited to a set of models containing the name/symbol of the last 10 calls.

The speech recognition device is most preferably activated by a press-and-hold, whereupon the device (speech recognition device) is informed by the pressing and holding of the key in question that you want speech recognition to commence. At the same time, the information about the pressed key is transmitted to the speech recognition device, i.e. speech recognition is limited, e.g. to words beginning with the letter on the key, whereupon only the reference models that the user wants are activated. It is also according to the invention that the speech recognition device is activated in a way other than by pressing a key, for example, by voice. In this case, after the activation of the speech recognition device, it is possible to use, during speech recognition, the reference model selection according to the invention as presented above.

An arrangement, according to the invention, can also be made for the menu structure of a mobile station, as shown in Table 2. Table 2 shows a specific part of the menu structure of a telephone. In this example, the main menu consists of the menus "Telephone Settings", "Messages" and "Memory Functions". Correspondingly, the menu "Messages" consists of the submenus "Read messages" and "Write messages". When a user of the telephone selects a menu function by voice or pressing a menu key, activation is limited to the points in the menu. In the example, activation by voice is directed to the menus "Telephone Settings", Messages" or "Memory Functions". The user can further manually select the submenu "Messages", in which case activation by voice is directed to the points "Read messages" or "Write messages" of the menu in question. The above-mentioned method can also be applied to external services for a mobile station and their activation. In this case, a specific key of the mobile station is defined for a specific service, e.g. for a WWW service (World Wide Web). In this case, the pressing and holding of the key in question enables, e.g. the selection of a bookmark of WWW addresses by using a voice command. In this application, the mobile station contains a table of letter symbols, which are selected as described above.

Figure 3:
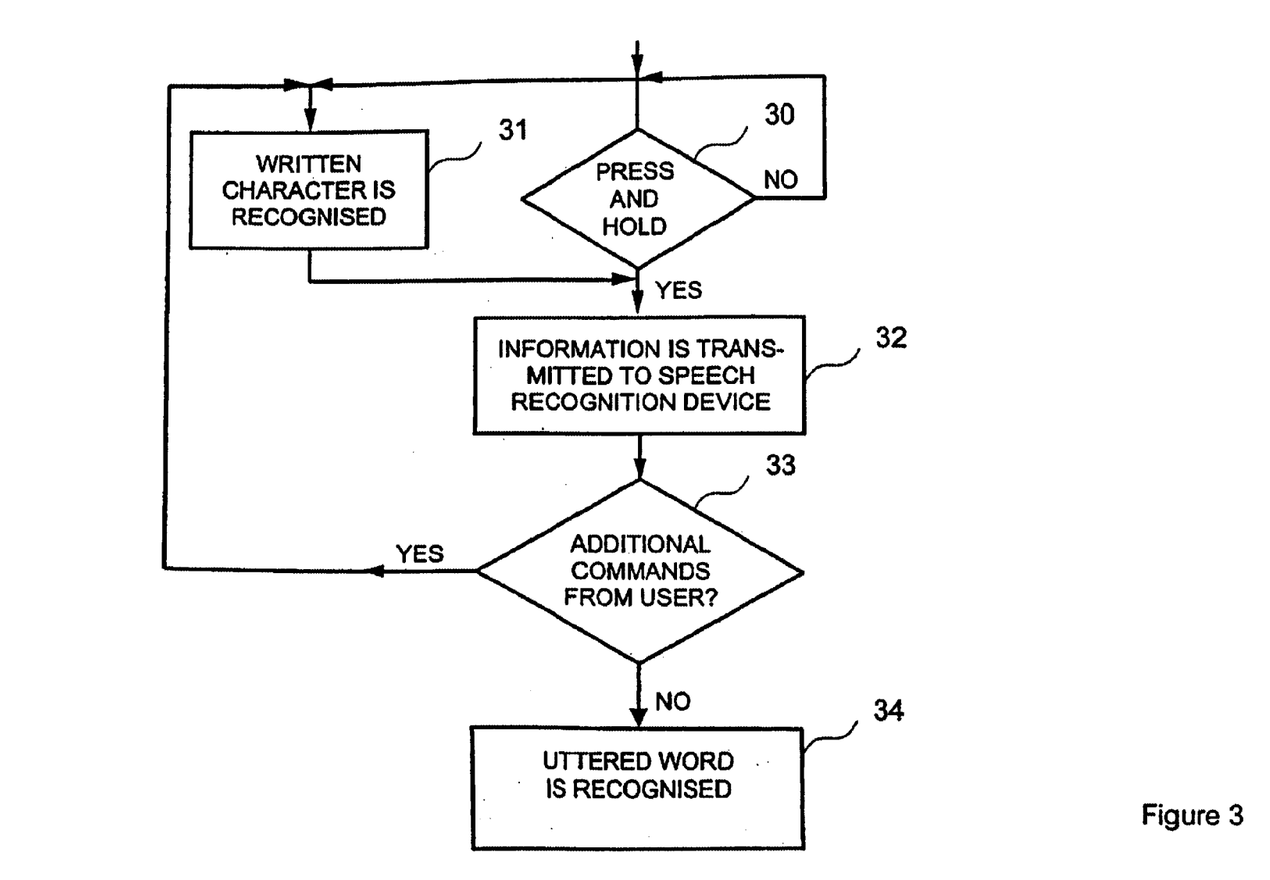
FIG. 3 shows the operation of a method, according to the invention, as a flowchart.

FIG. 3 shows the activity sequence of a method according to the invention. In Phase 30, it is discovered whether or not a user has carried out the press-and-hold that activates the speech recognition device. If no press-and-hold is discovered, the device remains in a state where the activation of the speech recognition device is being anticipated. Alternatively, the speech recognition device can be activated at the same time, when the user starts writing on a touch-sensitive surface, such as a screen. The activation of the speech recognition device may also be based on voice. In Phase 31, the letter/text written on the touch screen is recognised. In Phase 32, the information about the pressing of the key is transmitted to the speech recognition device and/or the information about the alphanumeric character written or drawn by the user on the touch screen is transmitted. It is also possible to draw, on the touch screen, some other figure that deviates from an alphanumeric character, which is utilised in speech recognition. In Phase 33, it is examined whether or not the user is still carrying out the pressing of keys or writing on the touch screen, in which case the information about these activities is also transmitted to the speech recognition device. This can be done by comparing the activities of the user with a specific time threshold value by means of which it is decided whether or not the user has concluded the giving of commands. In Phase 34, the word pronounced by the user is recognised by making use of the information provided in Phase 32.

Figure 4:
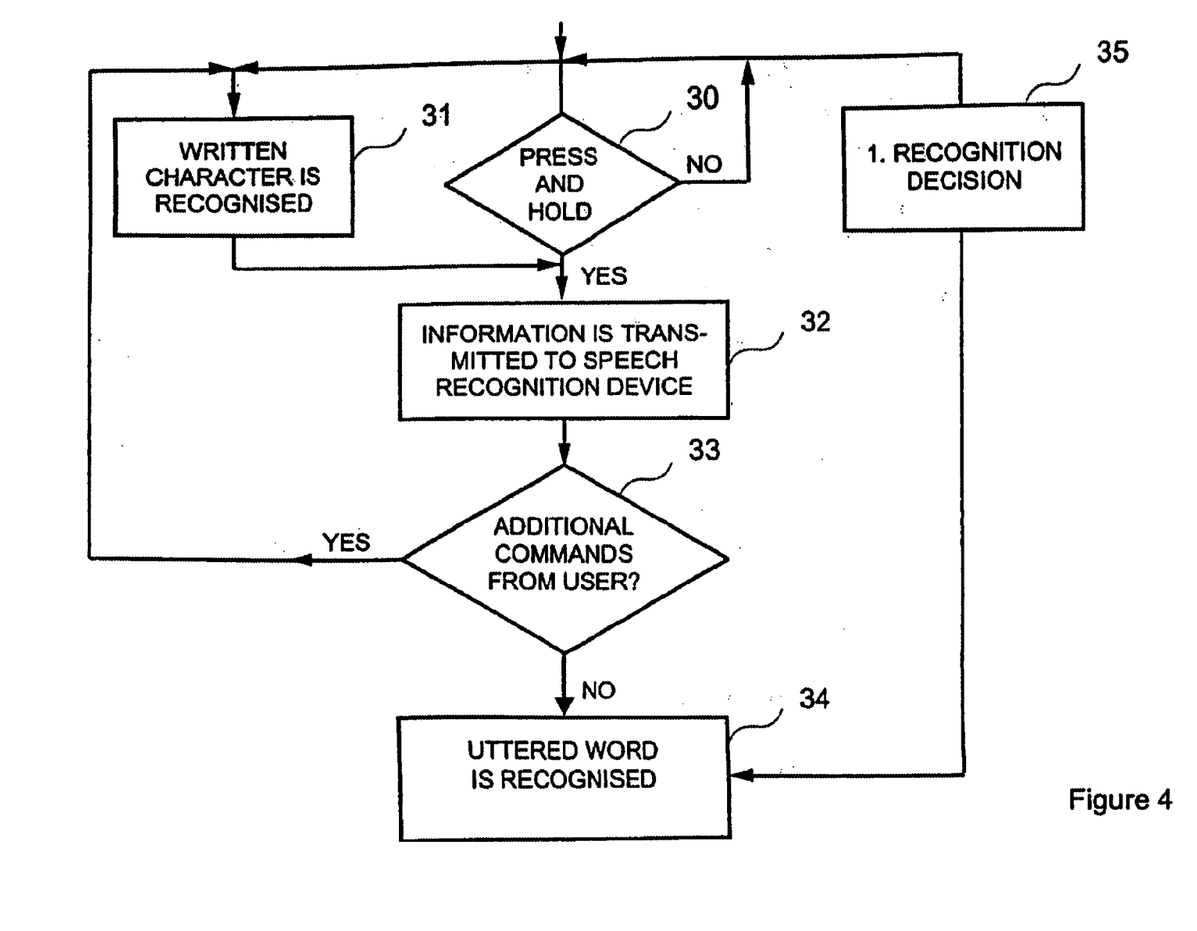
FIG. 4 shows the operation of another method, according to the invention, as a flowchart.

FIG. 4 shows another activity sequence of a method according to the invention. In this method, the pronounced word is first recognised traditionally and, only after this, the limitation provided by the user is utilised to limit the result obtained during the recognition phase. In FIG. 4, Phases 30–33 correspond with the corresponding phases in FIG. 3. In Phase 35, the utterance of the user is recognised by making use of all the prestored models. The information about this recognition result is transmitted to Phase 34, wherein the final recognition decision is made by comparing the first recognition decision with said sub-set of models, which has been obtained on the basis of the limitation provided by the user. The recognition decision obtained from Phase 35 contains a set of proposed words that have been recognised and the recognition probabilities corresponding with the words, which are transmitted to Phase 34. In case of a faulty recognition, the word that has got the highest recognition probability is not the word pronounced by the user. In this case, in Phase 34 according to the invention, it is possible to carry out the final speech recognition phase by means of the qualifier provided by the user and reach a higher speech recognition performance according to the invention. A method according to the invention may also operate so that the giving of a limitation and the recognition of a pronounced word are essentially simultaneous activities.

Figure 5:
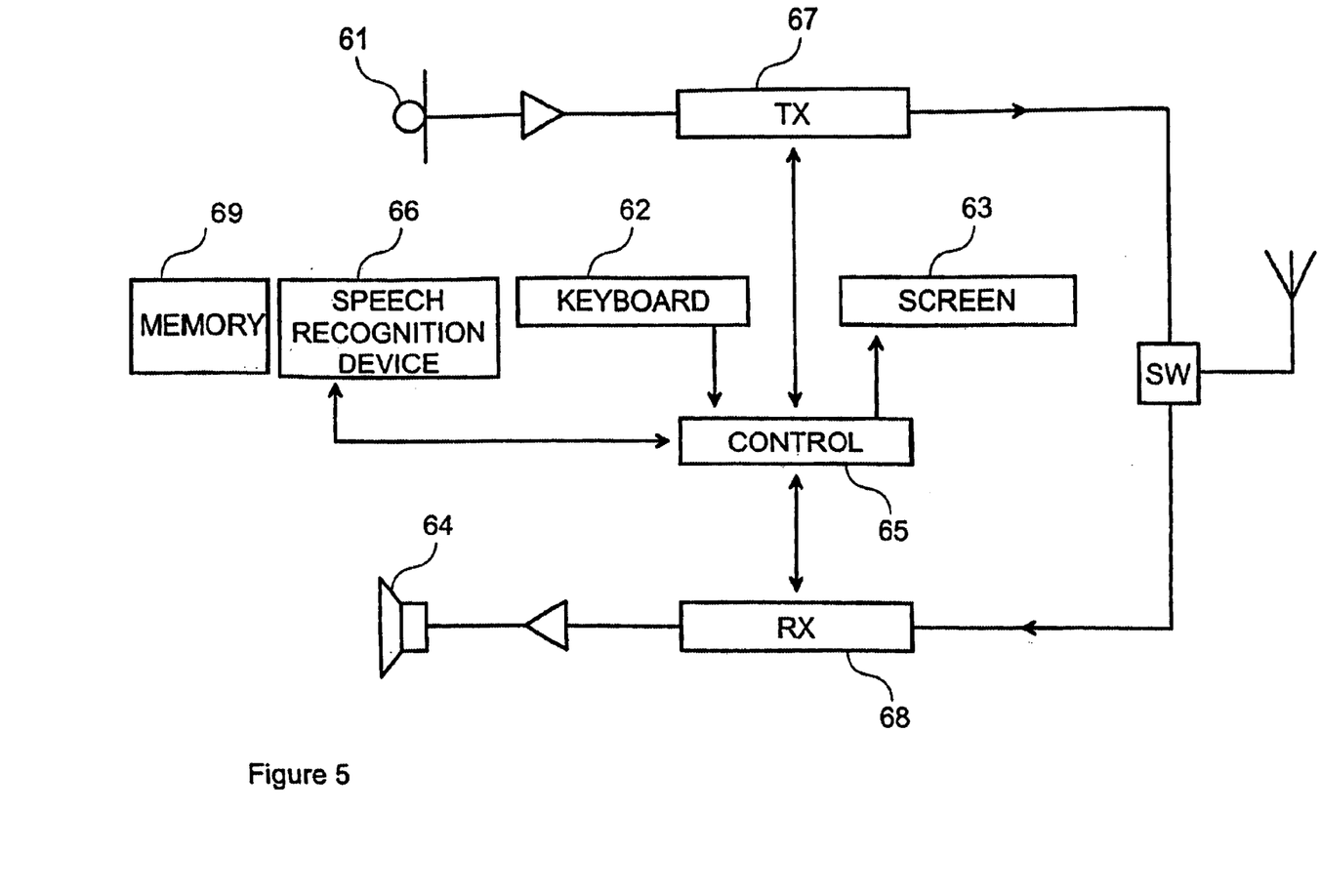
FIG. 5 shows the structure of a mobile station utilising a method according to the invention.

FIG. 5 shows the structure of a mobile station, which has a speech recognition device 66 that utilises the present invention. The mobile station comprises parts typical of the device, such as a microphone 61, a keyboard 62, a screen 63, a speaker 64, and a control block 65, which controls the operation of the mobile station. According to an embodiment of the invention, the screen 63 may be a touch-sensitive surface, such as a screen. In addition, the figure illustrates transmitter and receiver blocks 67, 68 typical of a mobile station. The control block 65 also controls the operation of the speech recognition device 66 in connection with the mobile station. When the speech recognition device is being activated either during the speech recognition device's training phase or during the actual speech recognition phase, the voice commands given by the user are transmitted, controlled by the control block, from the microphone 61 to the speech recognition device 66. According to the invention, the control block 65 transmits to the speech recognition device 66 the information about the commands given by the user through keys or about the alphanumeric character/figure entered on to the touch screen. The voice commands can also be transmitted through a separate HF (hands free) microphone. The speech recognition device is typically implemented by means of DSP and it comprises external and/or internal ROM/RAM circuits 69 necessary for its operation.

An embodiment of the present invention may comprise a device, e.g. a mobile station, which has a touch-sensitive surface, such as a touch-sensitive screen or base. In this case, a user writes the first letter of the word to be recognised on the touch-sensitive surface, e.g. with a pen or draws with a finger and simultaneously pronounces the word to be recognised (alternatively, the user presses the point of the letter displayed on the screen). In this case, the information about the provided letter is transmitted to the speech recognition device and speech recognition is limited to words in which the letter in question occurs. Recognition is most preferably limited to words that begin with the initial in question as described above. In this case, the user may write, according to the invention, on the touch-sensitive surface, e.g. the letter "S" and simultaneously pronounce the name to be recognised, e.g. "Smith", whereupon speech recognition is limited to names beginning with the letter "S".

Alternatively, the user may first write a letter on the touch screen and, after this, pronounce the word to be recognised. The above-mentioned method based on keys and writing on a touch-sensitive surface can also be combined, in which case the user can both write on a touch-sensitive surface and press some key and utilise both of these data in speech recognition. The touch-sensitive surface in itself is outside this invention, and it can be implemented in various ways according to prior art.

It can be estimated that with a method, according to the present invention, a recognition accuracy, which is 10–30-fold compared with recognition devices according to prior art can be achieved if the number of names to be recognised remains the same. On the other hand, by means of the invention, it is possible to recognise according to the invention 10–30 times as many names while the recognition accuracy remains unchanged. This improved capacity is based on a combination, according to the invention, whereupon commands given by the user through keys/a touch-sensitive surface, i.e. qualifiers limiting speech recognition search, are combined with speech recognition. One exemplary embodiment of the invention was based on the utilisation of a touch screen. An advantage of this application is that the algorithms used in text recognition and speech recognition are almost identical, whereupon the amount of program memory required does not increase much in a device, where both of these functions are implemented.

Above we described a mobile station as an exemplary embodiment of the present invention. However, the invention can equally well be applied, for example, to computers. The present invention is not limited to the embodiments presented above, and it can be modified within the framework of the enclosed claims.

What is claimed is:

1. A method for selecting a sub menu item of a prestored user interface menu structure by recognizing an utterance of a user with a device, wherein a set of models of the utterances have been stored in advance in the device for speech recognition, said models relating to menu items in the prestored user interface menu structure, and wherein the utterance of the user is received and compared with said prestored set of models of the utterances and, on the basis of the comparison, a recognition decision is made by the device, the method comprising the steps of:

the user providing a qualifier before said comparison limiting said comparison by touching the device, the qualifier identifying a menu item in said prestored user interface menu structure of the device, and wherein the device performs the steps of:

selecting a sub-set of models of the utterances from said prestored models of the utterances before said comparison, on the basis of the qualifier provided by the user, said sub-set of models of the utterances identifying at least one sub-menu item of said menu item of the prestored user interface menu structure identified by said qualifier, making the recognition decision based on a limited comparison by comparing the utterance of the user with said sub-set of models of the utterances, and selecting one sub-menu item of said menu item of the prestored user interface menu structure on the basis of the recognition decision.

2. A method according to claim 1, wherein said device comprises a speech recognition device that is activated in response to the qualifier provided by the user.

3. A method according to claim 2, wherein the user is enabled to provide said qualifier as a press-and-hold.

4. A method according to claim 1, wherein the user is enabled to provide said qualifier by pressing a key.

5. A method according to claim 4, wherein the user is enabled to provide said qualifier as a press-and-hold.

6. A method according to claim 1, wherein the user is enabled to provide said qualifier by writing an alphanumeric character on a touch-sensitive surface of the device.

7. A method for using a device to select a sub-menu item of a prestored user interface menu structure by recognizing an utterance of a user, wherein a set of models of user utterances have been stored in advance for speech recognition, said models relating to menu items in the prestored user interface menu structure, and wherein the utterance of the user is received and compared with said prestored set of models of the utterances and, on the basis of the comparison, a recognition decision is made regarding the word uttered, the method comprising the steps of:

providing said prestored menu structure for the device relating proposed words with a prestored set of models of user utterances, making a first recognition decision, in response to a set of proposed words uttered by a user, by making a comparison in the device of the utterance of the user with the prestored set of models of the utterances in the prestored user interface menu structure, with the device performing said first recognition decision by selecting a set of proposed words in the prestored user interface menu structure based on said comparison, enabling the user to provide a qualifier limiting the comparison by touching the device for selecting a sub-set of models of the utterances, the qualifier identifying a menu item in the prestored user interface menu structure of the device and said sub-set of models of the utterances being sub-menu items of said menu item the prestored user interface menu structure identified by said qualifier, and wherein the device performs the further steps of:
making a final recognition decision by making a comparison in the device of said each word of said set of proposed words of the first recognition decision with said sub-set of models of the utterances, and
selecting one sub-menu item of said menu item of the prestored user interface menu structure on the basis of the final recognition decision.

8. A method according to claim 2, wherein said device is a speech recognition device that is activated in response to the qualifier provided by the user.

9. A method according to claim 7, wherein the user is enabled to provide said qualifier by pressing a key.

10. A method according to claim 7, wherein the user is enabled to provide said qualifier by writing an alphanumeric character on a touch-sensitive surface of the device.

11. A method according to claim 10, wherein the user is enabled to provide said qualifier as a press-and-hold.

12. A speech recognition device for selecting a sub menu item of a prestored menu structure by recognizing the utterance of a user, the device comprising:

memory means for storing a set of models of the utterance of a user, means for providing a prestored user interface menu structure containing menu items relating to said set of models of user utterances, means for receiving the utterance of the user, comparison means for carrying out the recognition decision process by comparing the utterance of the user with the set of models of the utterances stored in the memory means, means for receiving a qualifier from the user in response to the user touching the device, said qualifier identifying a menu item in said prestored user interface menu structure, means for selecting a sub-set from the set of stored models of the utterances before activation of said comparison means, on the basis of the qualifier received from the user, for limiting the comparison made by the comparison means to said sub-set of models of the utterances, said sub-set of models of the utterances identifying sub items of the menu item, identified by the qualifier, in said prestored user interface menu structure, means for activating said comparison means to make the recognition decision by comparing the utterance of the user with said sub-set of models of the utterances, and means for selecting one sub-menu item of said menu item prestored user interface menu structure on the basis of the recognition decision.

13. A device according to claim 2, wherein the means for receiving the qualifier from the user comprises a keyboard.

14. A device according to claim 2, wherein the means for receiving the qualifier from the user comprises a touch-sensitive surface.

15. A device according to claim 2, wherein said means for selecting a sub-set of models and said means for activating said comparison means are activated in response to the qualifier received from the user.

16. A speech recognition device according to claim 12, further comprising means for identifying said set of models of the utterances as sub-menu items in the menu structure.

17. A speech recognition device for selecting a sub menu item of a prestored user interface menu structure by recognizing an utterance of a user, the device comprising:

memory means for storing models of the utterances, means for receiving the utterance of the user, first comparison means for carrying out a first recognition decision process by comparing the utterance of the user with the models of the utterances stored in the memory means, said models of the utterances relating to user interface menu items of the prestored user interface menu structure, said first recognition decision comprising a set of proposed words relating to a set of user interface menu items of the prestored user interface menu structure, means for receiving a qualifier from the user in response to the user touching the device, said qualifier identifying a menu item in said prestored user interface menu structure, means for selecting a set from the stored models of the utterances, on the basis of the qualifier received from the user, for limiting the comparison made by the first comparison means to said set of models of the utterances, said set of models of the utterances relating to sub-items of said menu item of the prestored user interface menu structure identified by said qualifier, second comparison means for carrying our a final recognition decision process by comparing each word of said set of proposed words of the first recognition decision and said set of models of the utterances, and means for selecting one word of the set of proposed words, said word relating to a sub-menu item of the prestored user interface menu structure, in order to select said sub-menu item of said menu item, on the basis of the final recognition decision.

18. A method for selecting a sub-menu item of a prestored user interface menu structure by recognizing an utterance of a user with a device, wherein a set of models of the utterances have been stored in advance in the device for speech recognition, said models relating to menu items in the prestored user interface menu structure, and wherein the utterance of the user is received and compared with said prestored set of models of the utterances and, on the basis of the comparison, a recognition decision is made by the device, the method comprising the steps of:

the user providing a qualifier before said comparison limiting said comparison by touching the device, the qualifier identifying a menu item in said prestored user interface menu structure of the device, and wherein the device performs the steps of:
selecting a sub-set of models of the utterances from said prestored models of the utterances before said comparison, on the basis of the qualifier provided by the user, said sub-set of models of the utterances identifying at least one sub-menu item of said menu item of the prestored user interface menu structure identified by said qualifier, making the recognition decision based on a limited comparison by comparing the utterance of the user with said sub-set of models of the utterances, and selecting one sub-menu item of said menu item of the prestored user interface menu structure on the basis of the recognition decision, wherein the user is enabled to provide said qualifier by writing an alphanumeric character on a touch-sensitive surface of the device.

19. A method for selecting a sub-menu item of a prestored user interface menu structure by recognizing an utterance of a user with a device, wherein a set of models of the utterances have been stored in advance in the device for speech recognition, said models relating to menu items in the prestored user interface menu structure, and wherein the utterance of the user is received and compared with said prestored set of models of the utterances and, on the basis of the comparison, a recognition decision is made by the device, the method comprising the steps of:

the user providing a qualifier before said comparison limiting said comparison by touching the device, the qualifier identifying a menu item in said prestored user interface menu structure of the device, and wherein the device performs the steps of:
selecting a sub-set of models of the utterances from said prestored models of the utterances before said comparison, on the basis of the qualifier provided by the user, said sub-set of models of the utterances identifying at least one sub-menu item of said menu item of the prestored user interface menu structure identified by said qualifier, making the recognition decision based on a limited comparison by comparing the utterance of the user with said sub-set of models of the utterances, and selecting one sub-menu item of said menu item of the prestored user interface menu structure on the basis of the recognition decision, wherein said device comprises a speech recognition device that is activated in response to the qualifier provided by the user, and wherein the user is enabled to provide said qualifier as a press-and-hold.

20. A speech recognition device for selecting a sub-menu item of a prestored menu structure by recognizing the utterance of a user, the device comprising:

memory means for storing a set of models of the utterance of a user, means for providing a prestored user interface menu structure containing menu items relating to said set of models of user utterances, means for receiving the utterance of the user, comparison means for carrying out the recognition decision process by comparing the utterance of the user with the set of models of the utterances stored in the memory means, means for receiving a qualifier from the user in response to the user touching the device, said qualifier identifying a menu item in said prestored user interface menu structure, means for selecting a sub-set from the set of stored models of the utterances before activation of said comparison means, on the basis of the qualifier received from the user, for limiting the comparison means to said sub-set of models of the utterances, said sub-set of models of the utterances identifying sub items of the menu item, identified by the qualifier, in said prestored user interface menu structure, means for activating said comparison means to make the recognition decision by comparing the utterance of the user with said sub-set of models of the utterances, and means for selecting one sub-menu item of said menu item prestored user interface menu structure on the basis of the recognition decision, wherein the means for receiving the qualifier from the user comprises a touch-sensitive surface.

21. A method for selecting a sub menu item of a prestored user interface menu structure by recognizing an utterance of a user with a device, wherein a set of models of the utterances have been stored in advance in the device for speech recognition, said models relating to menu items in the prestored user interface menu structure, and wherein the utterance of the user is received and compared with said prestored set of models of the utterances and, on the basis of the comparison, a recognition decision is made by the device, the method comprising the steps of:

the user providing a qualifier before said comparison limiting said comparison by touching the device, the qualifier identifying a menu item in said prestored user interface menu structure of the device, and wherein the device performs the steps of:
selecting a sub-set of models of the utterances from said prestored models of the utterances before said comparison, on the basis of the qualifier provided by the user, said sub-set of models of the utterances identifying at least one sub-menu item of said menu item of the prestored user interface menu structure identified by said qualifier, making the recognition decision based on a limited comparison by comparing the utterance of the user with said sub-set of models of the utterances, and selecting one sub-menu item of said menu item of the prestored user interface menu structure on the basis of the recognition decision, wherein the user is enabled to provide said qualifier by pressing a key, and wherein the user is enabled to provide said qualifier as a press-and-hold.

* * * * *

UNITED STATES PATENT AND TRADEMARK OFFICE
CERTIFICATE OF CORRECTION

PATENT NO. : 6,694,295 B2
DATED : February 17, 2004
INVENTOR(S) : Lindholm et al.

It is certified that error appears in the above-identified patent and that said Letters Patent is hereby corrected as shown below:

Column 9,
Line 28, "claim 2" should read -- claim 7 --.

Column 10,
Lines 4, 6 and 9, "claim 2" should read -- claim 12 --.

Signed and Sealed this

Tenth Day of August, 2004

JON W. DUDAS
*Acting Director of the United States Patent and Trademark Office*